(12) United States Patent
Stephens et al.

(10) Patent No.: US 10,981,350 B1
(45) Date of Patent: Apr. 20, 2021

(54) WOOD-GRAINED POLYMER SUBSTRATE

(71) Applicant: TANGENT TECHNOLOGIES LLC, Aurora, IL (US)

(72) Inventors: Andrew Stephens, Aurora, IL (US); Francisco Morales, Plano, IL (US); Tadeusz Rybka, Streamwood, IL (US)

(73) Assignee: Tangent Technologies LLC, Aurora, IL (US)

( * ) Notice: Subject to any disclaimer, the term of this patent is extended or adjusted under 35 U.S.C. 154(b) by 577 days.

(21) Appl. No.: 15/245,948

(22) Filed: Aug. 24, 2016

Related U.S. Application Data

(60) Provisional application No. 62/208,928, filed on Aug. 24, 2015.

(51) Int. Cl.

| | | |
|---|---|---|
| *B32B 27/08* | (2006.01) | |
| *B32B 3/26* | (2006.01) | |
| *B29C 48/07* | (2019.01) | |
| *B29K 23/00* | (2006.01) | |
| *B29L 7/00* | (2006.01) | |
| *B29L 9/00* | (2006.01) | |

(52) U.S. Cl.
CPC .............. *B32B 3/263* (2013.01); *B29C 48/07* (2019.02); *B32B 27/08* (2013.01); *B29K 2023/065* (2013.01); *B29L 2007/002* (2013.01); *B29L 2009/00* (2013.01); *B32B 2307/408* (2013.01); *B32B 2307/71* (2013.01); *B32B 2307/712* (2013.01); *B32B 2419/00* (2013.01)

(58) Field of Classification Search
CPC ..... B01F 5/0615; B29C 47/046; B29C 47/56; B32B 27/08; B29K 2023/065
USPC ......................................................... 428/151
See application file for complete search history.

(56) References Cited

U.S. PATENT DOCUMENTS

| | | |
|---|---|---|
| D92,186 S | 5/1934 | Little |
| 2,332,081 A | 10/1943 | Hunt |
| 2,632,204 A | 3/1953 | Murray |
| 3,247,047 A | 4/1966 | Buckley |
| 3,422,175 A | 1/1969 | Rowland |
| 3,443,278 A | 5/1969 | Nauta |
| 3,531,828 A | 10/1970 | Nauta |
| 3,608,261 A | 9/1971 | French et al. |
| 3,792,945 A | 2/1974 | Randall |
| 3,920,366 A | 11/1975 | Randall |

(Continued)

FOREIGN PATENT DOCUMENTS

| | | |
|---|---|---|
| DE | 1963161 | 6/1971 |
| DE | 2327512 | 12/1973 |

(Continued)

OTHER PUBLICATIONS

Thermally Fused Laminate (TFL) Panels (on-line), no date available. Retrieved from Internet Aug. 11, 2017, URL: http://funderamerica.com/productsltfl-panels/ (3 pages).

(Continued)

*Primary Examiner* — Maria V Ewald
*Assistant Examiner* — Daniel P Dillon
(74) *Attorney, Agent, or Firm* — McDermott Will & Emery LLP

(57) ABSTRACT

A wood-grained polymer substrate includes a plurality of layers of different colors. The substrate is formed into elongated boards and used in the production of various end products similar to natural wood.

24 Claims, 9 Drawing Sheets

(56) References Cited

U.S. PATENT DOCUMENTS

| | | |
|---|---|---|
| 4,280,950 A | 7/1981 | Nagata et al. |
| 4,661,392 A | 4/1987 | Kapstad |
| D299,793 S | 2/1989 | Yacovella |
| 4,836,814 A | 6/1989 | Bambara et al. |
| 5,110,530 A | 5/1992 | Havens |
| 5,126,088 A | 6/1992 | Andres |
| 5,232,751 A | 8/1993 | Cameron et al. |
| 5,866,639 A | 2/1999 | Dorchester et al. |
| 5,869,138 A | 2/1999 | Nishibori |
| D428,500 S | 7/2000 | Wederski |
| 6,083,601 A | 7/2000 | Prince et al. |
| 6,153,293 A | 11/2000 | Dahl et al. |
| 6,596,784 B1 | 7/2003 | King |
| D505,467 S | 5/2005 | Marr |
| D531,326 S | 10/2006 | Folliard |
| 7,137,229 B2 | 11/2006 | Pervan |
| 7,204,944 B2 * | 4/2007 | Piedboeuf ............ B01F 5/0615 264/73 |
| 7,410,687 B2 | 8/2008 | Dolinar |
| 7,507,464 B2 | 3/2009 | Walrath |
| 7,588,821 B2 | 9/2009 | Horwitz |
| 7,866,758 B2 | 1/2011 | Jang |
| D642,287 S | 7/2011 | Poland |
| D644,340 S | 8/2011 | Canales et al. |
| D653,779 S | 2/2012 | Oamen |
| D653,780 S | 2/2012 | Metcalf |
| 8,168,104 B2 | 5/2012 | Han et al. |
| 8,197,733 B2 | 6/2012 | Sudano |
| D668,794 S | 10/2012 | Trudel |
| D671,230 S | 11/2012 | Lee |
| D678,556 S | 3/2013 | Metcalf |
| 8,388,331 B2 | 3/2013 | Osada et al. |
| D710,117 S | 8/2014 | Euna |
| D732,191 S | 6/2015 | Price |
| D732,192 S | 6/2015 | Price |
| D732,193 S | 6/2015 | Price |
| D732,194 S | 6/2015 | Price |
| D732,195 S | 6/2015 | Price |
| D732,197 S | 6/2015 | Price |
| D780,333 S | 2/2017 | Davis |
| D780,335 S | 2/2017 | Davis |
| D782,070 S | 3/2017 | Metcalf et al. |
| D784,566 S | 4/2017 | Davis |
| D786,457 S | 5/2017 | Metcalf |
| 2003/0021915 A1 * | 1/2003 | Rohatgi ............... B27N 3/007 428/15 |
| 2004/0038002 A1 * | 2/2004 | Franco ............... B29C 47/0019 428/151 |
| 2007/0104930 A1 | 5/2007 | Grohman |
| 2008/0299351 A1 | 12/2008 | Buchholtz et al. |
| 2011/0151193 A1 | 6/2011 | Cantley et al. |
| 2011/0177291 A1 * | 7/2011 | Sudano ............... B29C 47/0028 428/151 |
| 2013/0224437 A1 | 8/2013 | Park et al. |
| 2016/0273228 A1 | 9/2016 | Metcalf et al. |

FOREIGN PATENT DOCUMENTS

| | | |
|---|---|---|
| EP | 0532340 | 3/1993 |
| FR | 2738768 | 12/1999 |
| GB | 1489591 | 10/1977 |
| JP | H07-214631 | 8/1995 |

OTHER PUBLICATIONS

DeGroot, "Synthetic Decking Roundup," *Professional Deck Builder* 1-8 (2012).

Koepplmayr et al., "Numerical and Experimental Modeling of a Multiflux Static Mixer for Continuous Extrusion of Layered Polymer Blends," *14th European Conference on Mixing, At Warsaw, Poland*, (Sep. 2012).

Van der Hoeven et al., "Homogeneity of multilayers produced with a Static Mixer," *Polymer Engineering And Science*, 41(1): 1-18 (2001).

StaMixCo, "Principles of Operation of Static Mixers," Static Mixer Products & Technology, accessed on the Internet at: https://web.archive.org/web/20081209081624/http://www.stamixco-usa.com:80/principles-of-operation/default.html (Dec. 9, 2008).

* cited by examiner

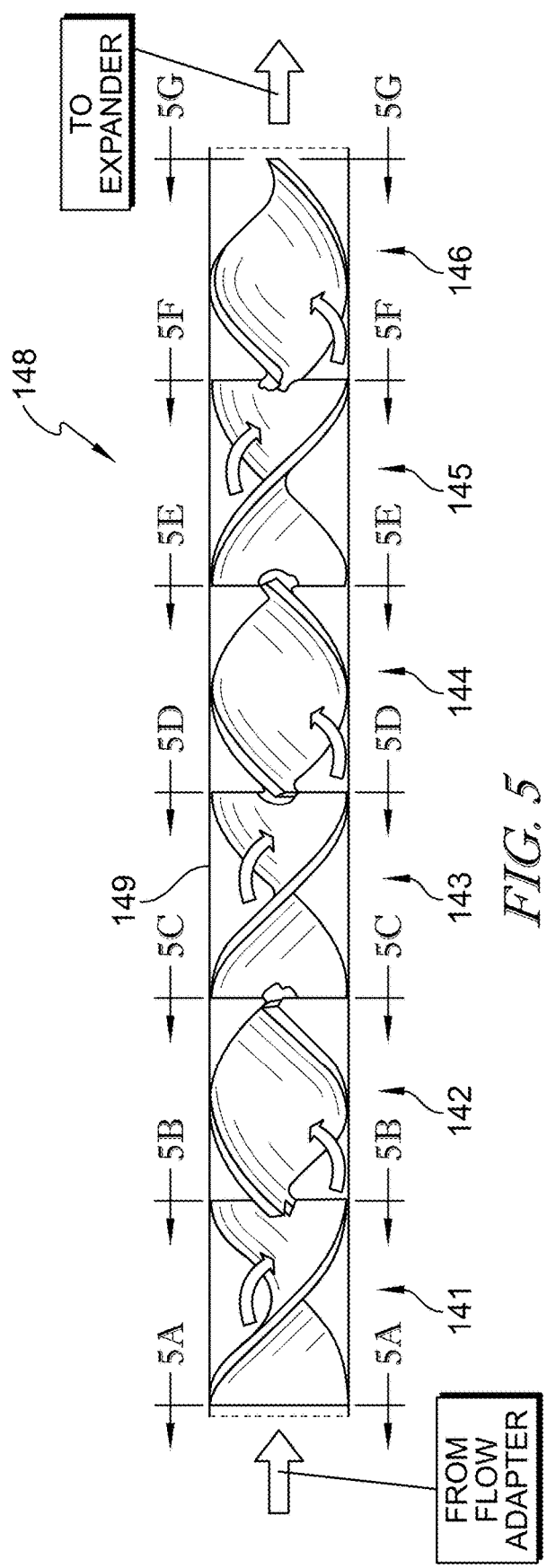
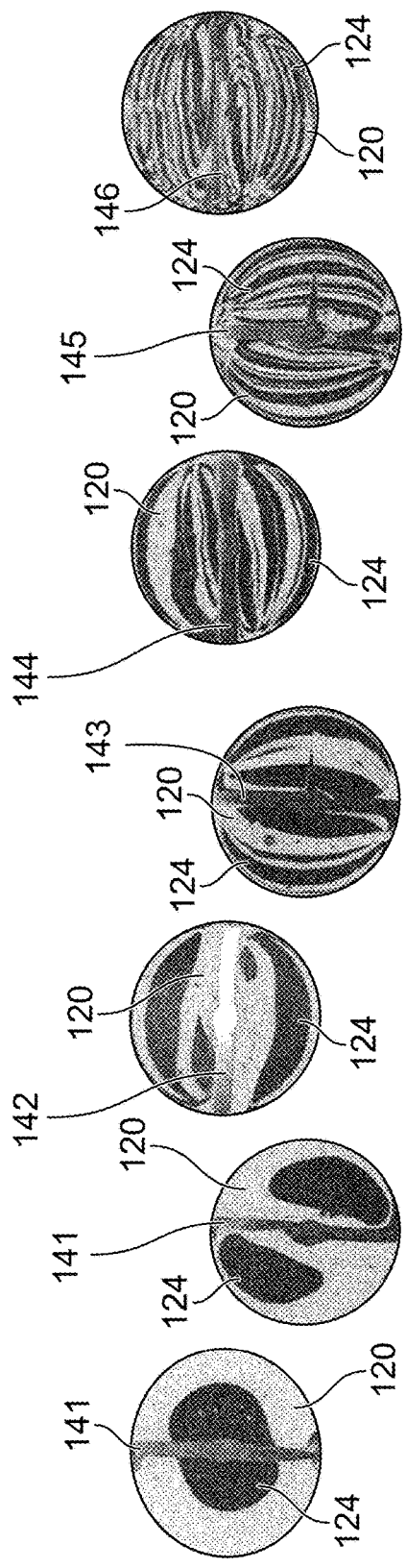
FIG. 5
FIG. 5A  FIG. 5B  FIG. 5C  FIG. 5D  FIG. 5E  FIG. 5F  FIG. 5G

WOOD-GRAINED POLYMER SUBSTRATE

CROSS REFERENCE TO RELATED APPLICATIONS

This application claims priority to and the benefit of U.S. Provisional Patent Application No. 62/208,928, filed Aug. 24, 2016, the disclosure of which is now expressly incorporated herein by reference.

FIELD OF THE DISCLOSURE

The present disclosure relates to polymer composites and more particularly to polymer composites that are used as a natural wood substitute or replacement.

BACKGROUND

The decking industry has seen numerous introductions of composite and alternative plastic lumber decking products over the past decade. Composite decking typically comprises 50% wood fiber or particles and 50% polyethylene plastic to act as a binder to hold the wood particles together. This entire matrix is extruded into linear deck boards (TREX brand is one example). Due to undesirable qualities of this product, many companies have added a coextruded polymer cap layer around the exterior of the board, which has little or no wood fiber to protect the wood fiber/plastic matrix in the core from exposure and deterioration due to environmental exposure.

In recent years, as composite products have evolved, manufacturers have introduced several colors to the exterior coextruded layer to produce a surface which has varied color tones to emulate natural wood. This wood grain appearance is only skin deep and cutting or planning of the wood composite removes this coextruded cap layer to expose the standard fiber-filled, homogenous core.

The standard plastic extrusion process is designed to evenly mix all ingredients to produce consistent quality of product. Introducing multiple colors at the beginning of the extrusion process results in a homogeneous mixture of a single color. The industry produced multiple color tones by utilizing color concentrates (streaker colors) that have carrier resins that melt at relatively high temperatures. By keeping the temperature zones on the extrusion process at or near the temperatures of the melting point of the streaker colors, the streaker color concentrates would soften but not melt immediately whereby the streaker color concentrates would release color randomly and produce a streak effect.

This effect would produce a short string of color on the surface of the board. However, the streakers only produced a line of color in a single direction, usually along the extrusion direction, and when cut would not create a wood-grain like appearance through a core of the board. For example, in U.S. Pat. App. Pub. No. 2004/0038002, the streak effect shows color variation that starts and stops within a short distance due to the individual color pellet softening, streaking and then being consumed in a discrete area of the board. With the board cut, pockets of color appear on the end surface, but are discontinuous and do not form a wood-grained appearance.

For co-extruded products, streakers would cause a cap layer to have varied color tones on the surface, but the core of the product remains a single color as evident when the board is cut or planed. For example, in U.S. Pat. App. Pub. No. 2011/0177291, streaker pellets are swirled in an extruder to form a "two-dimensional" cap layer for co-extrusion with a foam core. The cap layer has streaks of color at the surface, but is thin and does not extend into the core of the finished product.

Attempts have also been made to produce polymer boards having a wood-grained appearance through a core of the board. For example, in Japanese Patent No. H07-214631, different colored plastics are extruded through concentric rings, and the molten flow becomes turbulent to swirl the colors together. However, the process produces inconsistencies in the finished product due to the turbulent flow of the extrusion, and cutting the board can expose portions having minimal or irregular color patterns, such as breaks or gaps in the lines, presenting similar problems to the streakers discussed above.

Another example is French Patent No. 2,738,768 which illustrates a process for simultaneously extruding plastics of different colors to coalesce them into a single product without mixing together. However, the process has similar deficiencies to that of Japanese Patent No. H07-214631 discussed above. The patterns produced in the processes of these references are not consistent throughout the board, and post processing steps, such as cutting, can produce visible surfaces with undesirable characteristics.

SUMMARY

The present disclosure may comprise one or more of the following features and combinations thereof.

In illustrative embodiments, a high density polyethylene wood-grained substrate includes a plurality of layers of different colors. The substrate is formed into elongated boards which each include a first set of polymer layers formed that include a first colorant. The substrate includes a second set of polymer layers that include a second colorant different than the first colorant. The first and second layers alternate within the substrate to form a wood-grained appearance throughout the entire substrate.

These and other features of the present disclosure will become more apparent from the following description of the illustrative embodiments.

BRIEF DESCRIPTION OF THE DRAWINGS

FIG. 5 is a side elevation view of a set of section inserts used in the extrusion machine to form layers of different color polymers as suggested in FIGS. 5A-5G;

FIGS. 5A-5G are sectional views taken at the beginning and end of each section insert in FIG. 5;

DETAILED DESCRIPTION OF THE DRAWINGS

Figure 1:
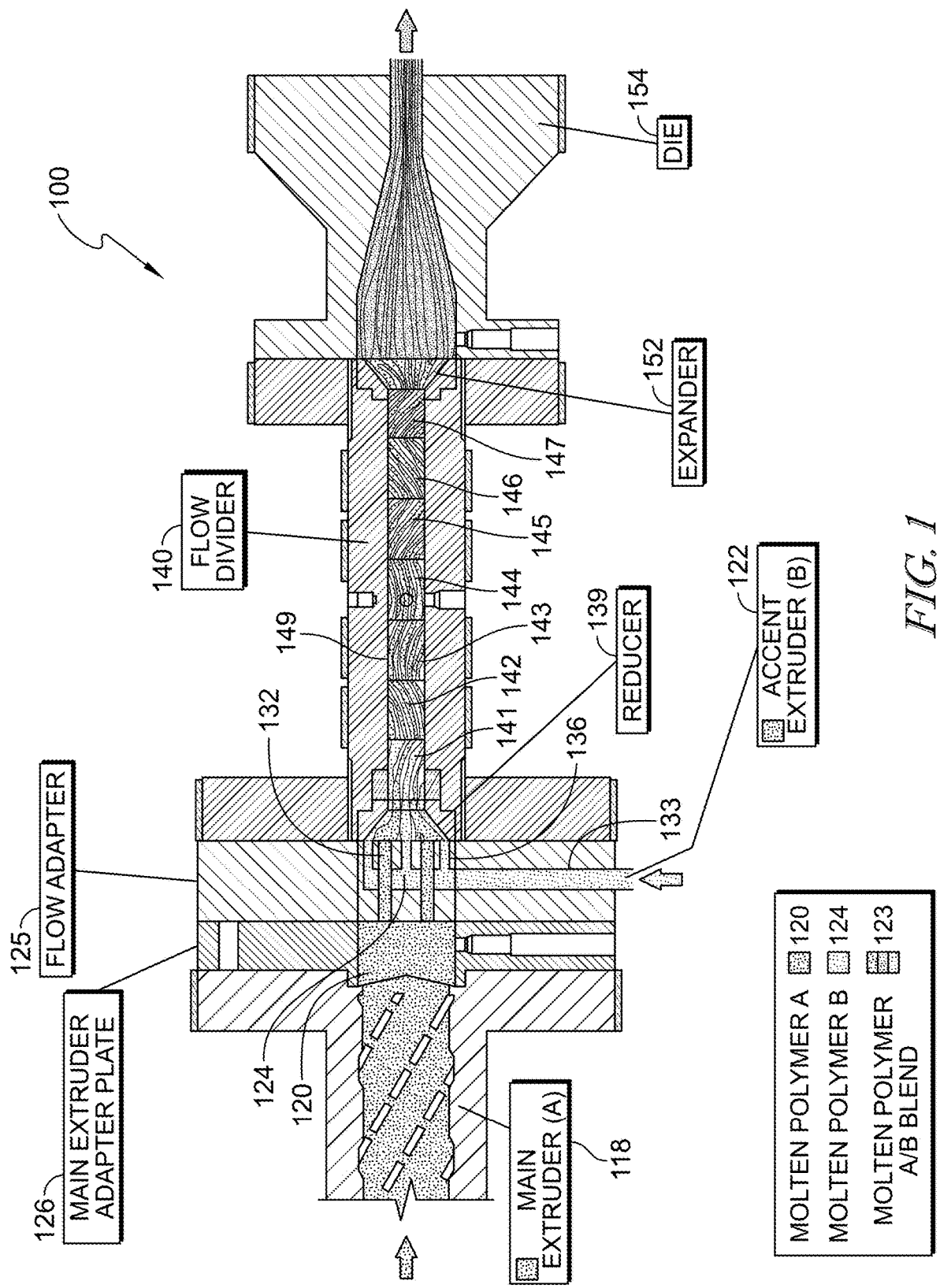
FIG. 1 illustrates a sectional view through an extrusion machine used to manufacture wood-grained polymer substrates of the present disclosure.

For the purposes of promoting an understanding of the principles of the disclosure, reference will now be made to a number of illustrative embodiments illustrated in the drawings and specific language will be used to describe the same.

An illustrative extrusion machine 100 in accordance with the present disclosure is shown in FIG. 1. Extrusion machine 100 is used to form wood-grained polymer substrates 10, 210, as shown in FIGS. 6-11, having varying patterns of simulated wood grain which extend through and along each substrate 10, 210. Substrates 10, 210 can be made from polymer based materials, such as recycled high density polyethylene (HDPE), having at least two different colorants added thereto to define the wood-grain patterns. Polymer substrates 10, 210 can be free of natural wood or other organic fibers. Polymer substrates 10, 210 can include additives, such as UV inhibitors, foaming agents, and color concentrates, to produce polymer substrates having desired colors and material properties, such as durability and strength.

Figure 12:
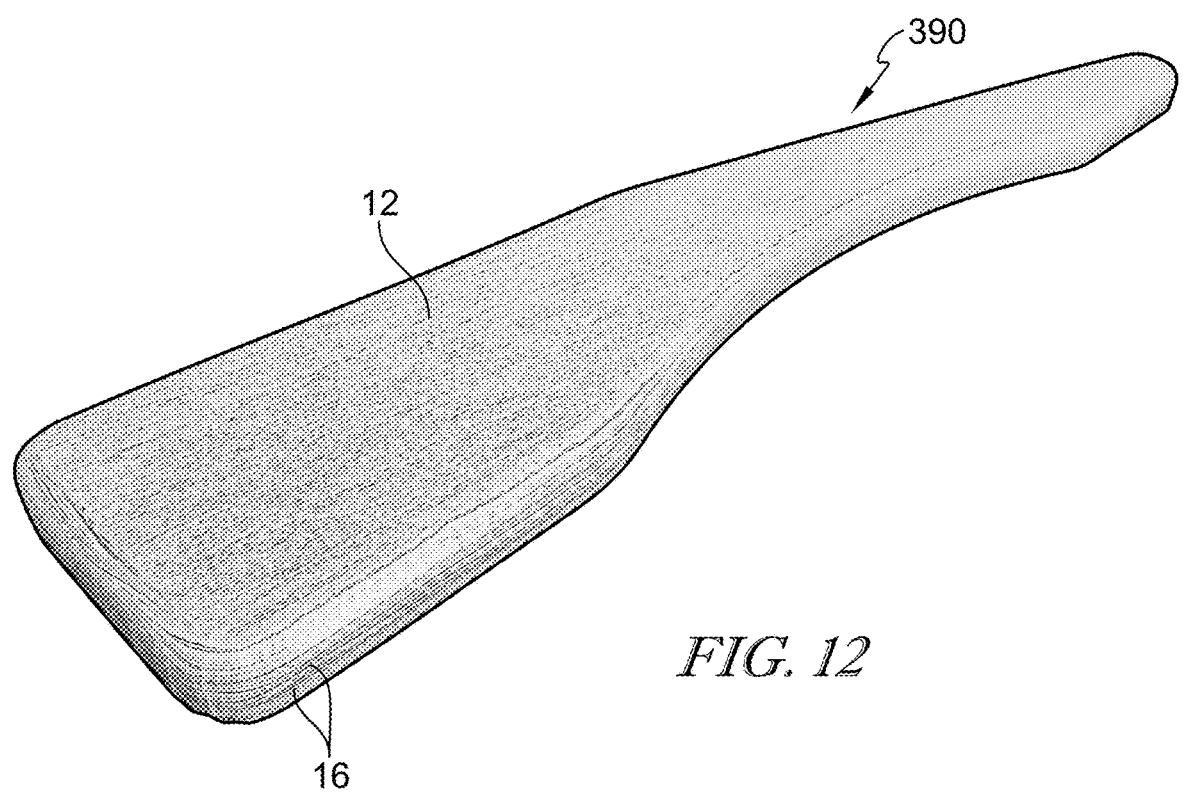
FIG. 12 is a perspective view of one embodiment of an end product formed using a polymer substrate of the present disclosure.
Figure 13:
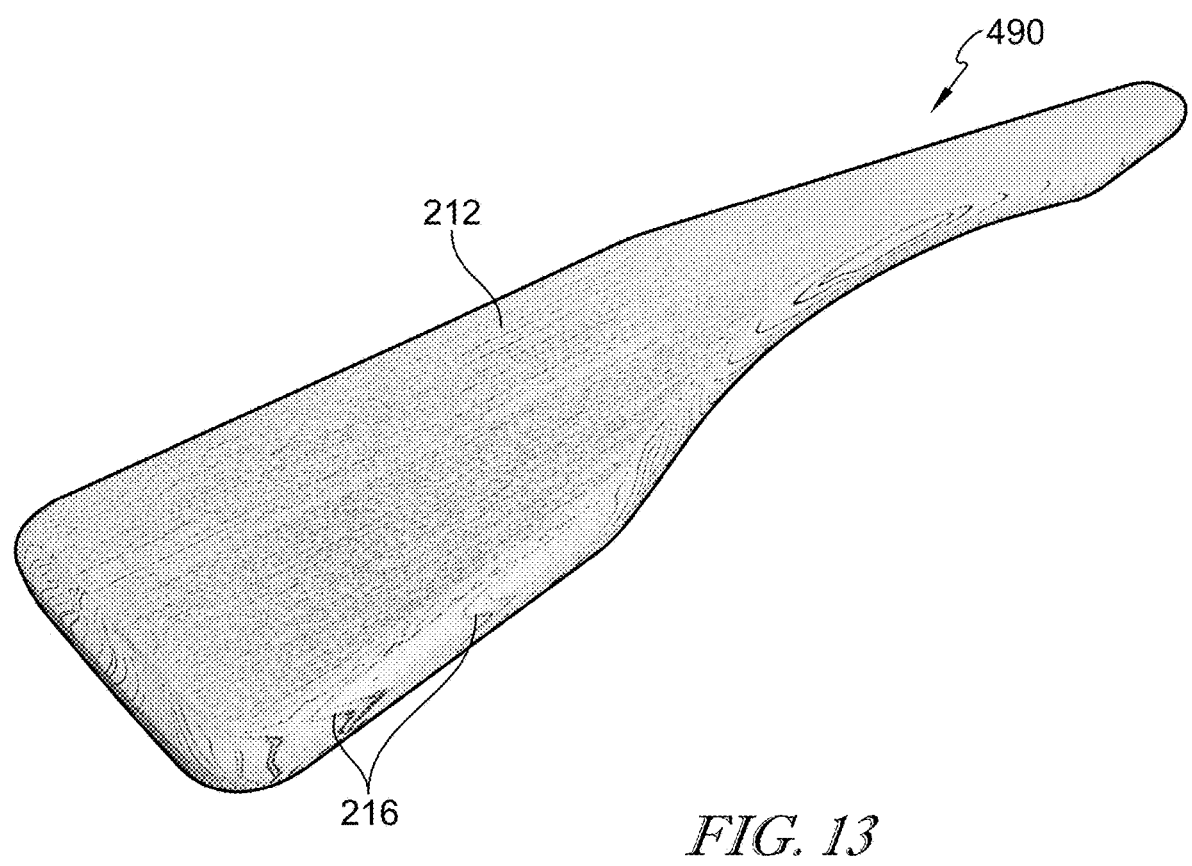
FIG. 13 is a perspective view of another embodiment of an end product formed using a polymer substrate of the present disclosure.

The wood-grained polymer substrates 10, 210 can be post-processed, such as by planning or embossing, and cut to form various sized boards used to make polymer-lumber end products, such as those shown in FIGS. 12 and 13. The boards can be shipped to customers that design and build a multitude of end products, such as furniture, and they can fabricate the end products using the wood-grained polymer boards of the present disclosure just as they typically would using natural wood lumber. Fabrication using the polymer boards could include drilling, routing, and cutting to build multi-component products such as outdoor furniture, including adirondack chairs and park benches for example.

Figure 6:
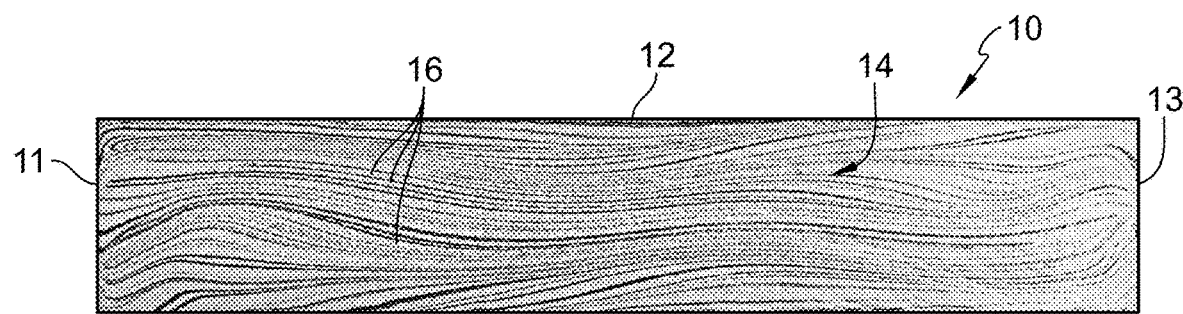
FIG. 6 is sectional view taken through one embodiment of a polymer substrate in accordance with the present disclosure showing a wood grain pattern of the polymer substrate.
Figure 7:
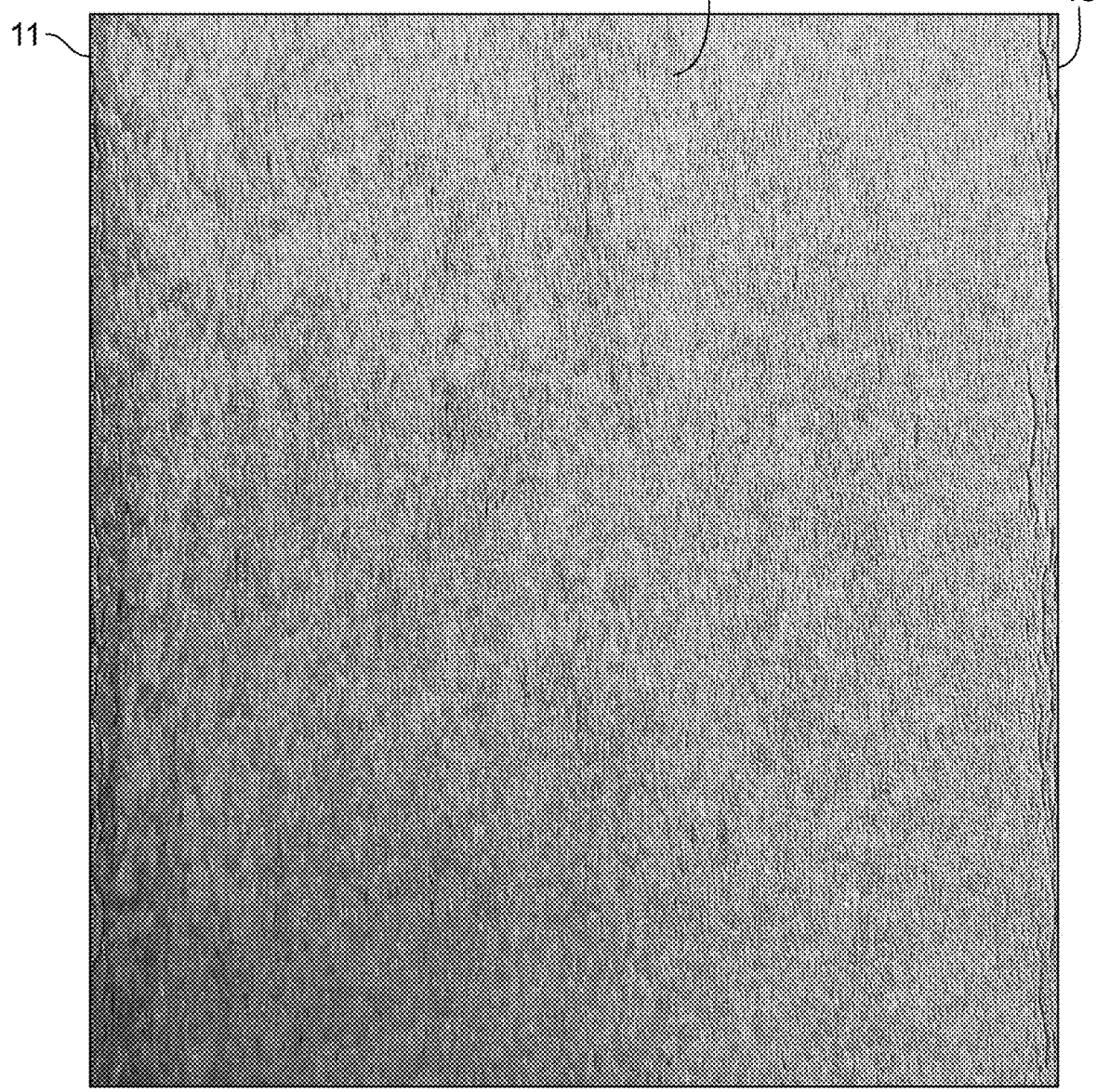
FIG. 7 is a top plan view of the polymer substrate of FIG. 6 showing colorations on a surface of the substrate form the different color polymers.
Figure 8:
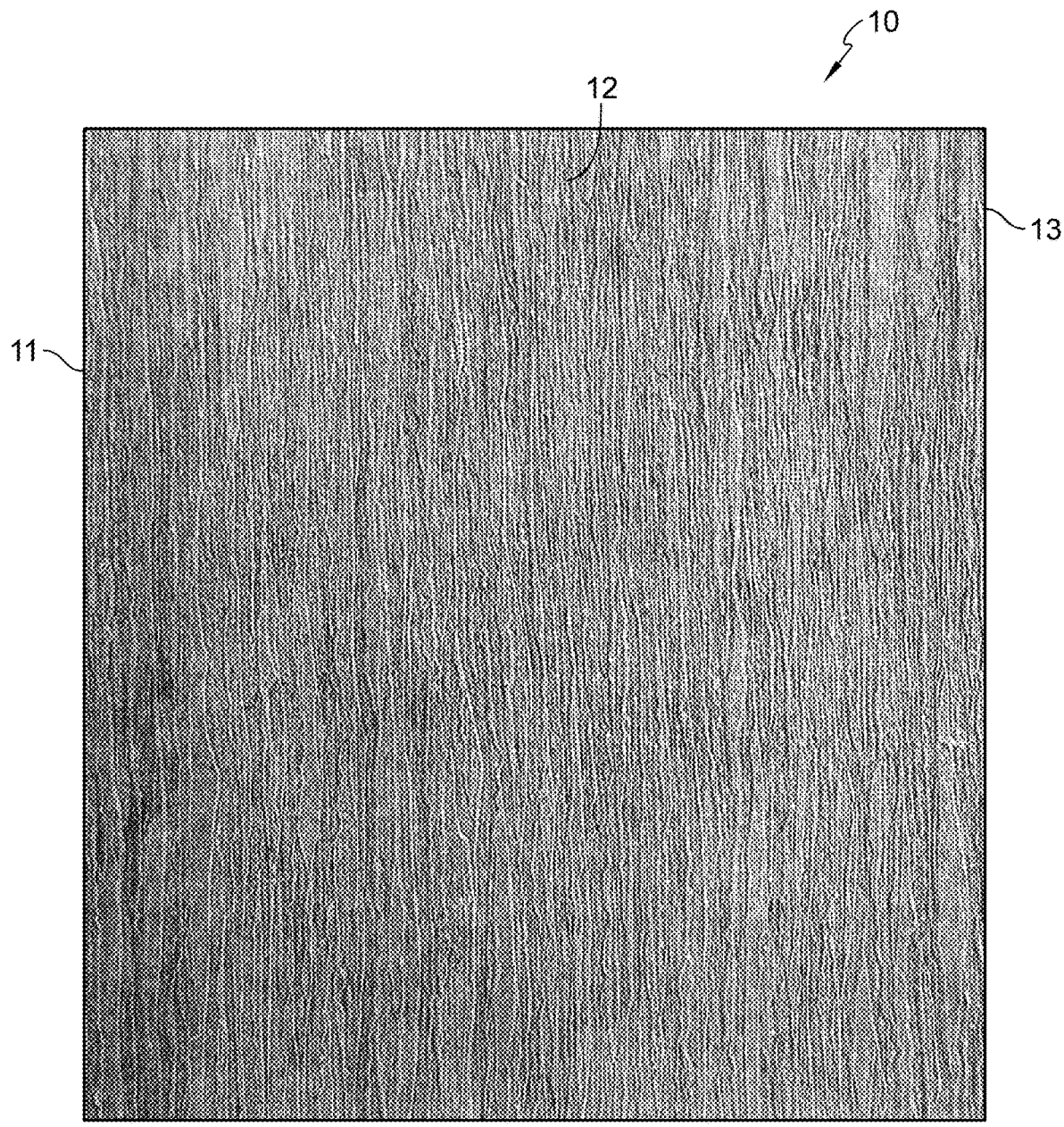
FIG. 8 is a view similar to FIG. 6 showing embossing on an outer surface of the polymer substrate.
Figure 9:
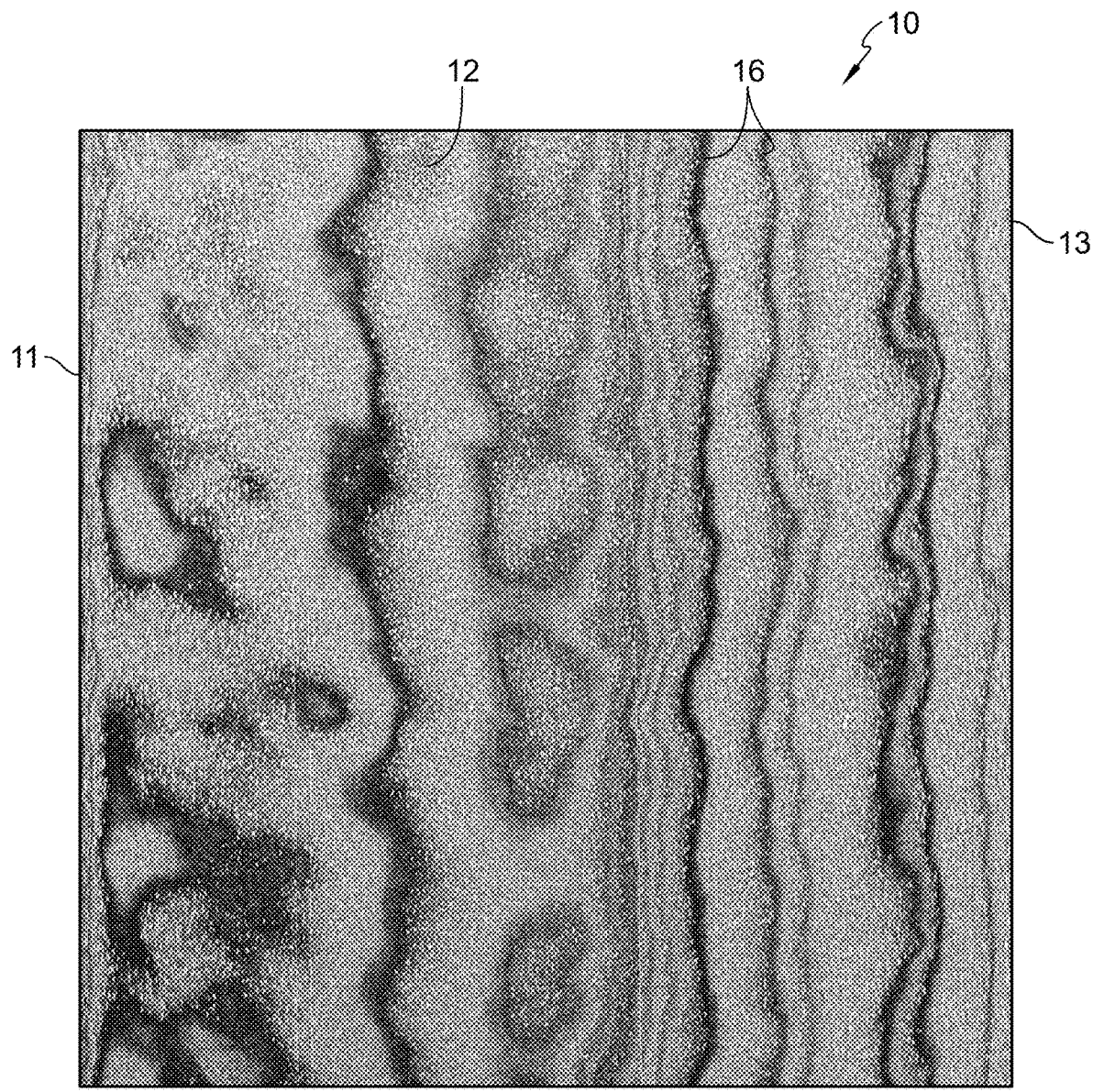
FIG. 9 is a view similar to FIG. 6 showing a wood grain pattern of the polymer substrate after a portion of the outer surface is removed.
Figure 10:
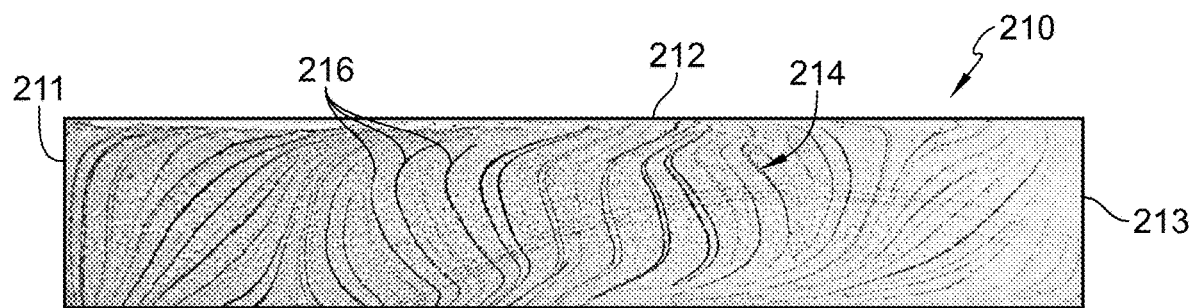
FIG. 10 is sectional view taken through another embodiment of a polymer substrate in accordance with the present disclosure showing a wood grain pattern of the polymer substrate.
Figure 11:
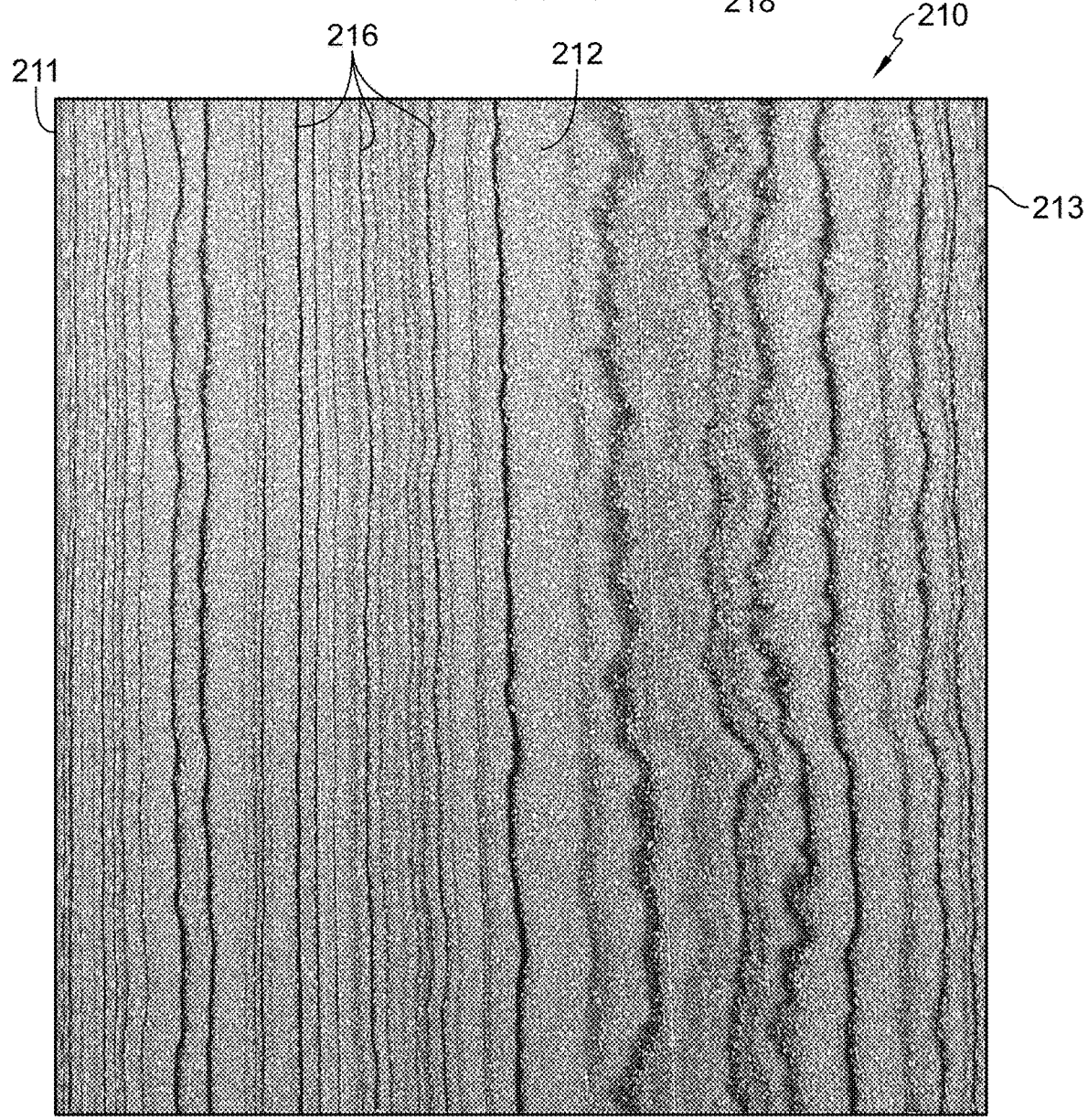
FIG. 11 is a top plan view of the polymer substrate of FIG. 10 showing a wood grain pattern of the polymer substrate after a portion of the outer surface is removed.

Each polymer substrate 10, 210 includes a multi-tone, simulated natural wood-grain effect that runs throughout the entire substrate (cross section) as shown in FIGS. 6 and 10. The simulated wood grains 16, 216 also extend to an outer surface, for example top surface 12, 212, of each substrate 10, 210 so that when removal of material occurs, such as through planning or cutting, the multi-tone wood grain effect remains both on the surface 12, 212 as well as with an exposed core 14, 214 of the substrates as suggested in FIGS. 9 and 11. Alternatively, or in addition to planning, outer surface 12, 212 of substrates 10, 210 can be embossed, such as with a wood grain pattern, as suggested in FIG. 8.

In one embodiment, polymer substrate 10 of the present disclosure includes continuous linear lines of color wood grain patterns 16 particularly within the core 14 and exposed core surfaces 12 to emulate wood rings or graining, as shown in FIGS. 6-9. In the illustrative embodiment, polymer substrate 10 is made using extrusion machine 100, shown in FIG. 1, from a first polymer 120 and a second polymer 124. A first extruder 118 is adapted to extrude first polymer 120 which is blended with a primary (main) base color. The first polymer 120 forms the lighter portions of polymer substrate 10. First polymer 120 includes a polymer material, such as a high density polyethylene resin. In some embodiments, the first polymer 120 is mixed with other additives, such as foaming agent, UV stabilizers, color concentrates, and other fillers such as fiberglass, minerals, etc.

A second extruder 122 of extrusion machine 100 is adapted to extrude second polymer 124 as shown in FIG. 1. Second polymer 124 includes a polymer material, such as a high density polyethylene resin. In some embodiments, the second polymer 124 is mixed with other additives, such as foaming agent, UV stabilizers, color concentrates, and other fillers such as fiberglass, minerals, etc.

Second polymer 124 is blended with an accent color used to form wood grain patterns 16 of substrate 10 as suggested in FIG. 6. The accent color for second polymer 124 and base color for first polymer 120 are different from one another. The accent color is chosen to complement the base color, and each will remain distinctive in the final extrusion. In some embodiments, the base and accent colors simulate the colors in natural wood, whether fresh cut, dried, aged, or otherwise. In some embodiments, the grains 16, 216 of substrates 10, 210 simulate natural wood grain, and the base and accent colors used are generally not characteristic of natural wood, such as purple, orange, black, and pink, just to name a few.

In some embodiments, first and second polymers 120, 124 partially intermix, along with the main and accent colors, to produce shade and combinations of color which are identified as polymer A/B blend(s) 123 as suggested in FIG. 1. For example, first polymer 120 could be white in color and second polymer 124 could be black in color. When blended according to the present disclosure, areas that intermix showing shades of gray are defined as polymer A/B blend 123. One or more additional accent color extruders can be used to add other accent colored resins into the flow stream through extrusion machine 100.

A flow adapter 125 is coupled to first extruder 118 by securing flow adapter 125 to an adapter plate 126 by use of fasteners, such as bolts, as suggested in FIG. 1. Flow adapter 125 is positioned to receive the output flows from extruders 118, 122 and configured to initiate the combined flow of first and second polymers 120, 124 through extrusion machine 100. The combined flow of first and second polymers 120, 124 is then directed to flow divider 140 for formation of the wood grain pattern.

Figure 2:
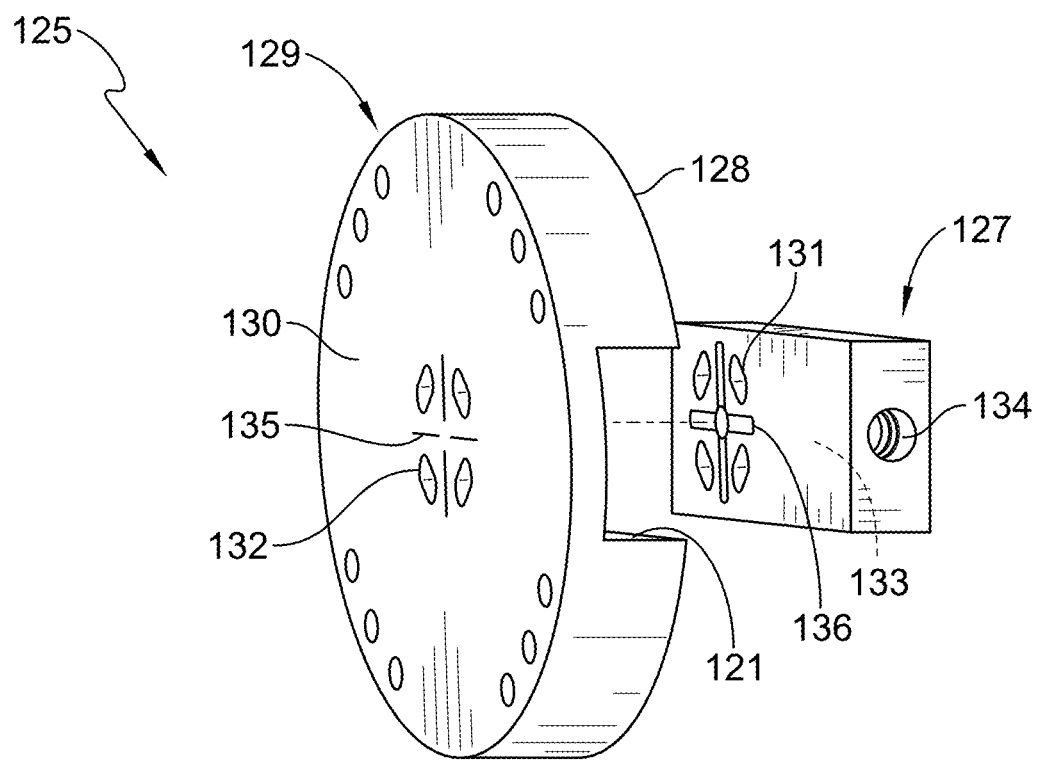
FIG. 2 is an exploded perspective view of a flow adapter of the extrusion machine of FIG. 1 showing that the flow adapter includes a body plate and an co-extrusion insert.
Figure 3:
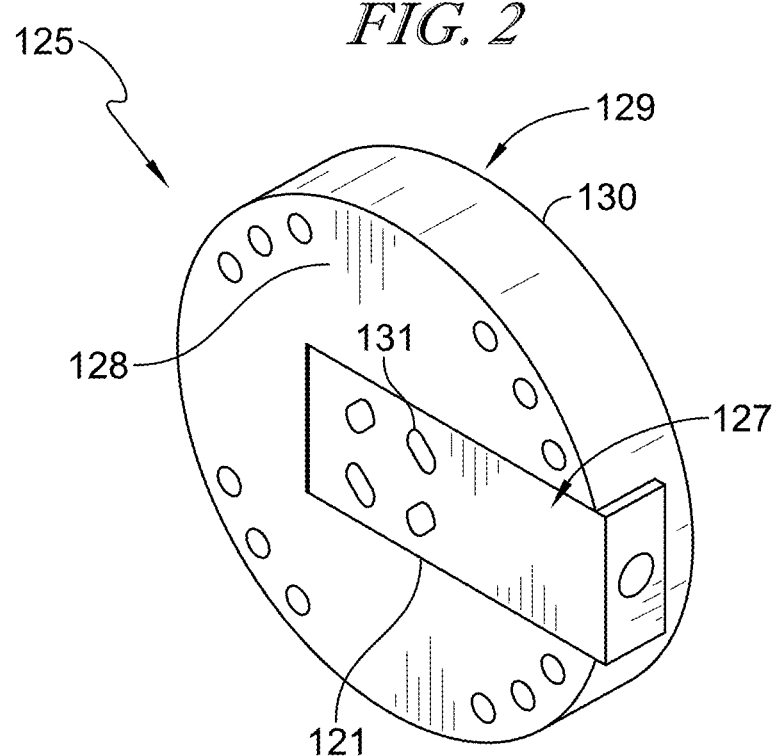
FIG. 3 is a perspective view of the flow adapter of FIG. 2.
Figure 4:
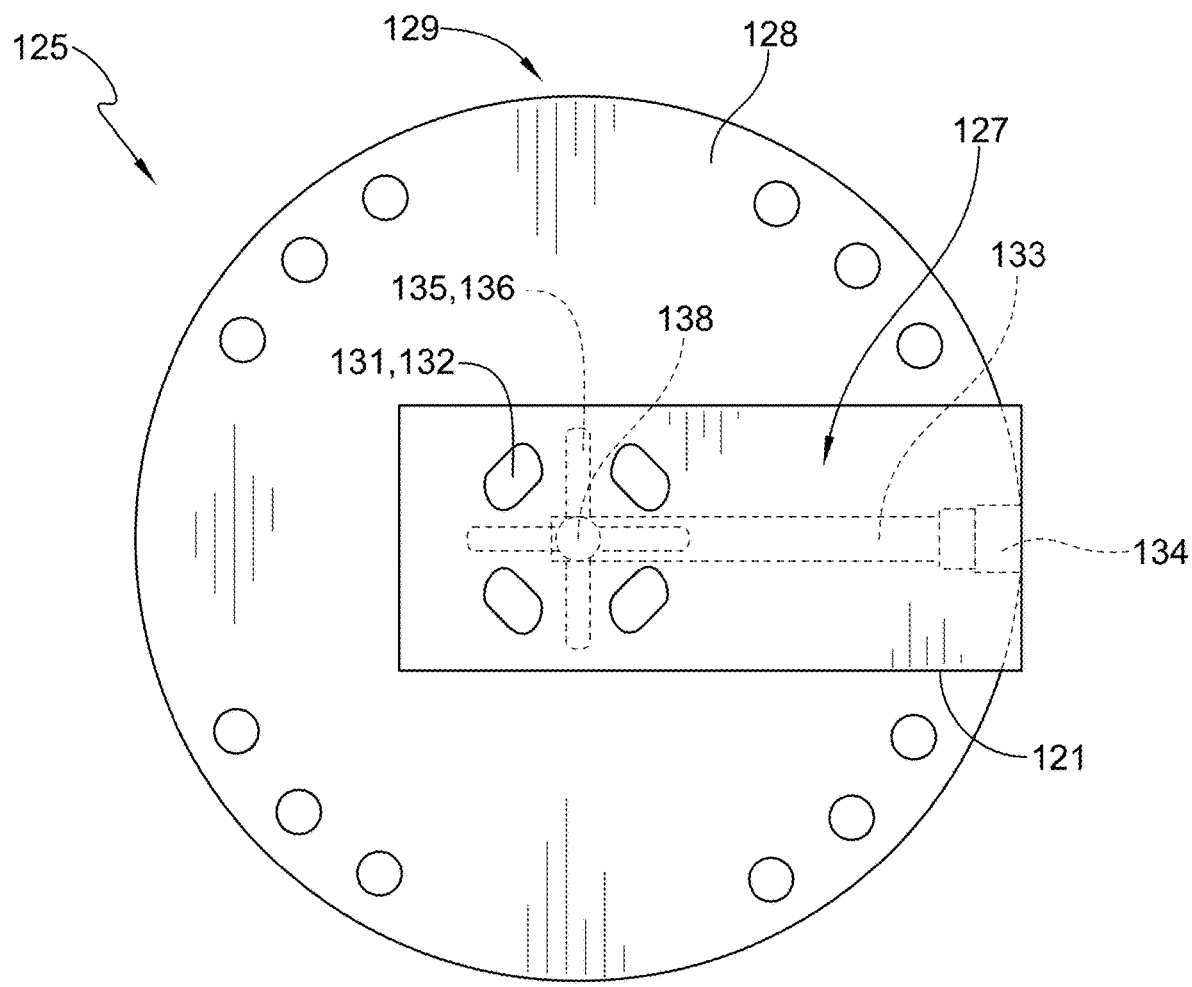
FIG. 4 is a front elevation view of the flow adapter of FIG. 2.

Flow adapter 125 includes a body plate 129 and a co-extrusion insert 127 as shown in FIGS. 2-4. Body plate 129 includes a first face 128 and a second face 130, and is formed to include a slot 121 in first face 128. A series of first apertures 132 are formed through second face 130 and into slot 121. A series of pass-through apertures 131 extend through co-extrusion insert 127 in a similar pattern to first apertures 132. Slot 121 is configured to receive co-extrusion insert 127 to align first apertures 132 of body plate 129 with pass-through apertures 131 of co-extrusion insert 127. Aligned first apertures 132 and pass-through apertures 131 allow first polymer 120 to flow through flow adapter 125 from first face 128 to second face 130 as suggested in FIGS. 1-4.

Co-extrusion insert 127 is also formed to include an internal passageway 133 that is coupled to second extruder 122 at a first end 134 and is in fluid communication with injection ports 136 at a second end 138 as shown in FIGS. 2 and 4. A series of second apertures 135 are formed through second face 130 of body plate 129 into slot 121 and are positioned between first apertures 132 such that first and second apertures 132, 135 alternate with one another around a centerline of the extrusion machine 100 as suggested in FIG. 2.

Injection ports 136 align with second apertures 135 when co-extrusion insert 127 is received in slot 121 as suggested in FIGS. 2-4. Body plate 129 and co-extrusion insert 127 cooperate so that first and second polymers 120, 124 are extruded together through flow adapter 125. In the illustrative embodiment, first apertures 132 are larger than second apertures 135. This arrangement allows second polymer 124, which is the accent color, to exit the flow adapter 125 simultaneously with first polymer 120 in a defined geometric relationship and proportional flow rate. Flow adapter 125 permits the ability to design a variety of patterns and flow rates of first and second polymers 120, 124 to associate with different profile sizes and well as different linear graining and streaking aesthetics by changing the number and size of the openings 132, 135.

The combined flow of first and second polymer 120, 124 exit from flow adapter 125 and enter a reducer 139 of extrusion machine 100 as shown in FIG. 1. Reducer 139 increases pressure of the flow by reducing a cross section of the combined extrusions. Reducer 139 directs the flow of the first and second polymers 120, 124 into flow divider 140.

Flow divider 140 includes a channel 149 formed through flow divider 140 and a plurality of section inserts 141-147 positioned within the channel 149 as shown in FIG. 1. Section inserts 141-147 are coupled to one another to form a continuous dividing element 148 as suggested in FIG. 5. In the illustrative embodiment, each section insert 141-147 is a plate having opposing ends twisted relative to one another to form a helical profile. Section inserts 141-147 are coupled to one another such that the helical profile along the combined dividing element is offset and reversed with each connected section insert 141-147.

Section inserts 141-147 cut across and redirect the combined flow of first and second polymer 120, 124 as the flow passes through channel 149 of flow divider 140 as suggested in FIGS. 1 and 5-5G. Section inserts 141-147 can be of different designs and fit together in a variety of orientations to vary the wood grain patterns 16 of polymer substrate 10. For illustrative purposes, six section inserts 141-146 are shown in FIG. 5. Seven section inserts 141-147, as shown in FIG. 1, can be included in the flow divider 140, but it is contemplated that any number of section inserts can be used to vary the grain pattern formed in the polymer substrate 10. Generally, the number of section inserts can be used to control the number of layers in the substrate. More or less section inserts can also be used depending on the size of the substrate being produced.

In the illustrative embodiment, the design, orientation, and number of section inserts 141-147 determine the linear graining and layering aesthetics for a particular profile size and shape of polymer substrate 10. For example, as suggested in FIGS. 5 and 5G, a horizontal (longitudinal to the substrate) orientation of the final end of the dividing element 148 produces horizontal layers in the flow, which leads to horizontal grains in the final polymer substrate 10 as suggested in FIG. 6. Having the final end of the dividing element 148 oriented vertically produces vertical (transverse to the substrate) layers in the flow, which leads to vertical grains in the final polymer substrate 10 as suggested in FIG. 10.

With each successive section insert 141-147, the interlayering of first polymer 120 and second polymer 124 increases the amount of linear graining between the two polymers 120, 124 as well as promote the polymer A/B blending 123 which produces multiple color combinations and layers of the two colors as depicted in FIGS. 5A-5G. The portions of the flow contacting the channel 149 and inner dividing element 148 experience less movement than other portions of the flow due to the viscosity of the material. The continuous dividing and rotation of the flow causes layers of first and second polymer 120, 124 to form on one another within the flow rather than forming a homogeneous mixture.

The combined flow of layered polymers 120, 124 exiting section insert 147 enters an expander 152 as shown in FIG. 1. Expander 152 reduces pressure of the flow by allowing the flow to expand. Expander 152 directs the flow into the entry of a die 154 for forming the general profile of polymer substrate 10. The substrate 10 enters tooling with similar dimensions to the die exit to begin cooling and forming the final product.

As shown in FIG. 6, polymer substrate 10 can be cut through the core 14 to expose the wood grain pattern 16 created by extrusion machine 100. The wood grain 16 in the core 14 of polymer substrate 10 is oriented generally horizontal and the individual grains are closely spaced to one another. The grains 16 (formed from second polymer 124) are generally thinner than the remaining layers (formed from first polymer 120) of the substrate 10. Outer surfaces 12 of polymer substrate 10 have a matte finish and limited wood grain visibility after exiting the die 154 as suggested in FIG. 7. In some embodiments, surfaces 12 of polymer substrate 10 can be further enhanced by embossing techniques applied to the surfaces 12 as suggested in FIG. 8. Embossing can provide a texture similar to natural wood lumber and add to the wood grain effect in the final product. Alternatively or in addition to embossing, a thin layer can be removed from each outer surface 12, such as by planning, to expose the wood grain pattern 16 as suggested in FIG. 9. In the illustrative embodiment, a burling effect is created due to the horizontally oriented and closely spaced grains 16.

As noted above, variations in wood grain patterns can be created depending upon the arrangement of the flow divider. A polymer substrate 210 produced by extrusion machine 100 includes vertical graining 216 in a core 214 of polymer substrate 210 as shown in FIG. 10. The wood grain 16 in the core 14 of polymer substrate 10 is oriented generally vertical and the individual grains are widely spaced from one another. The grains 216 (formed from second polymer 124) are generally thinner than the remaining layers (formed from first polymer 120) of the substrate 10. Similar post processing steps to polymer substrate 10 can be performed on polymer substrate 210. For example, planning of outer surfaces 212 of polymer substrate 210 can expose the wood grain 216 as suggested in FIG. 11. In the illustrative embodiment, the exposed grains generally align with one another along a length of the substrate 210 due to the vertically oriented and widely spaced grains 216. In some embodiments, the grains 216 mimic the organic rings of a tree.

The illustrative process can be used to form polymer substrates form 10, 210 continuously as an extrudate. As noted above, polymer substrates 10, 210 can be cut to form polymer boards used in the construction of various end products. In the illustrative embodiment, boards are created by making subsequent cuts across the extrudate to define a length of the board, with the orientation of the ends of the board defining a length direction. Various cross-sectional profiles are possible, such as round, polygonal, or other unique shapes, such as those used for molding used around windows and doors for example. These profiles can be created using the die 154, or through post processing of the boards.

The wood-grain patterns 16, 216 in the resulting boards formed from polymer substrates 10, 210 generally extend along the length of the board. In some embodiments, a majority of the wood grains 16, created by the layers of the second polymer 124, extend along the length of the entire board. Likewise, the remaining portions of the board, created by the interspersed layers of the first polymer 120, also generally extend along the length of the board. In some embodiments, a majority of the layers of the first polymer 120 extend along the length of the entire board. This creates a substantially consistent pattern along the length of the board such that cuts various points along a length of the board will expose a substantially similar grain pattern.

As noted above, the wood grains 16, 216 can be oriented along different directions. In some embodiments, a width direction of the substrate 10 is oriented such that wood grains 16 extend between lateral sides 11, 13 of substrate 10 as suggested in FIG. 6. The layers of first and second polymers 120, 124 are stacked from a bottom surface 18 of substrate 10 toward the top surface 12. In some embodiments, a width direction of the substrate 10 is oriented such that wood grains 216 extend between top surface 212 and a bottom surface 218 of substrate 210 as suggested in FIG. 10. The layers of first and second polymers 120, 124 are stacked from a lateral surface 211 toward a lateral surface 213 of substrate 210. Generally, the width direction is perpendicular to the length direction and rotationally oriented around the length direction.

The width direction (i.e., cross-direction of the grains 16, 216) can assume various orientations to change the orientation of the grains 16, 216 to simulate natural wood grains of different patterns. For example, the exposed grain patterns in natural wood assume different orientations depending on the portion of the timber the board is cut from. The orientation of the grains 16, 216 can be changed to simulate these different patterns. In the illustrative embodiments, the grains 16, 216 extend along curvilinear paths across the width of the substrates 10, 210. In some embodiments, a majority of the grains 16, 216 extend substantially uninterrupted across the board, i.e., with minimal or no gaps in the visible grain 16, 216.

In illustrative embodiments, the other portions of the substrates 10, 210 formed by the first polymer 120 are similar to the grains 16, 216. The layers formed by the first polymer 120 extend along a length of the boards made from the substrates 10, 210 and across a width of the boards. In some embodiments, the grains 16, 216 are thinner than the layers formed by the first polymer 120.

Example of illustrative end products formed using the wood-grained polymer boards of the present disclosure are shown in FIGS. 12 and 13. A chair armrest 390 formed using polymer substrate 10, which was embossed on the outer surfaces 12, is shown in FIG. 12. The exposed wood grain 16 is clearly visible after cutting out the shape of the armrest 390 while the embossing provides the feel of natural wood. Another example of a chair armrest 490 formed using polymer substrate 210, which was embossed on the outer surfaces 212, is shown in FIG. 13. The exposed wood grain 216 is clearly visible after cutting out the shape of the armrest 490 while the embossing provides the feel of natural wood. Other structural and non-structural uses, such as decking and siding for example, are contemplated by this disclosure.

In illustrative embodiments, a wood-grained polymer substrate is provided having alternating layers of differently colored polymer material to produce a simulated natural wood grain appearance. The wood grain appearance runs through a core of the substrate such that the simulated wood grains are exposed when the substrate is cut. The wood-grained polymer substrate can be cut to length to form a wood-grained polymer board. The wood-grain polymer board use useful in the production of various end products, such as furniture and decking for example. The grain patterns are adjustable to simulate various cuts of natural wood timber. The grain patterns are substantially consistent along a length of the board such that cuts across the board at various points along the length will expose similar patterns.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A simulated natural wood-grained polymer board having a first side and a second side spaced apart from the first side, the spacing between the first and second sides defining one of a width or a height of the board, the first and second sides extending along a length direction between a first end and a second end, the first and second ends defining a length of the board, the board comprising:
   a first set of polymer layers extending along the length direction and containing a first colorant, a majority of the first set of polymer layers extending along the length of the entire board;
   a second set of polymer layers extending along the length direction and containing a second colorant different than the first colorant, a majority of the second set of polymer layers extending along the length of the entire board; and
   wherein a plurality of individual layers of the first and second sets of polymer layers alternate within the board and extend along a substantially uninterrupted curvilinear path originating proximate the first side of the board and terminating proximate the second side of the board.

2. The board of claim 1, wherein the layers of the first set of polymer layers are thinner than the layers of the second set of polymer layers.

3. The board of claim 1, wherein a portion of at least one of the first side and second side of the board is removed to expose portions of the first and second sets of polymer layers along the length direction.

4. The board of claim 3, wherein the exposed portions of the first and second sets of polymer layers form a burled grain pattern.

5. The board of claim 1, wherein at least one of the first and second sides of the board is embossed with a wood grain pattern.

6. The board of claim 1, wherein the first and second sets of polymer layers are formed from high density polyethylene.

7. The board of claim 6, wherein the first and second sets of polymer layers further include at least one of a UV inhibitor and a foaming agent.

8. The board of claim 6, wherein one of the first and second sets of polymer layers further includes a foaming agent.

9. The board of claim 1, wherein the board is formed to define a polygonal cross-section along a length of the board.

10. A simulated natural wood-grained polymer substrate extending along a first direction, the substrate having a first side and a second side spaced apart from the first side along a second direction different than the first direction, the first and second sides defining a width of the substrate, the first and second sides extending along the first direction, a core of the substrate extending between the first and second sides and along the first direction, the substrate comprising:
  a first set of polymer layers extending along the first direction and containing a first colorant, a majority of the first set of polymer layers being substantially continuous along the first direction; and
  a second set of polymer layers extending along the first direction and containing a second colorant different than the first colorant, a majority of the second set of polymer layers being substantially continuous along the first direction;
  wherein individual layers of the first and second sets of polymer layers alternate within the core of the substrate to form a natural wood-grained appearance throughout the core of the substrate; and
  wherein a plurality of the individual layers of one of the first and second sets of polymer layers extend along a substantially uninterrupted curvilinear path in the second direction originating proximate the first side and terminating proximate the second side.

11. The substrate of claim 10, wherein the layers of the first set of polymer layers are thinner than the layers of the second set of polymer layers.

12. The substrate of claim 10, wherein the first and second sets of polymer layers are formed from high density polyethylene.

13. The substrate of claim 12, wherein the first and second sets of polymer layers further include at least one of a UV inhibitor and a foaming agent.

14. The substrate of claim 12, wherein one of the first and second sets of polymer layers further includes a foaming agent.

15. The substrate of claim 10, wherein the substrate is formed to define a polygonal cross-section along a length of the substrate.

16. The board of claim 6, wherein the core is substantially free of natural wood materials.

17. The board of claim 1, further comprising a third side and a fourth side spaced apart from the third side along a height direction different than the length direction and width direction, wherein the third and fourth sides define a height of the board, wherein the third and fourth sides extend along the length direction between the first and second ends, wherein the core of the board extends between the first, second, third, and fourth sides and between the first and second ends, and wherein the individual layers of the first and second sets of polymer layers alternate within the core of the board along the height direction.

18. The substrate of claim 12, wherein the core is substantially free of natural wood materials.

19. The substrate of claim 10, further comprising a third side and a fourth side spaced apart from the third side along a third direction different than the first and second directions, wherein the third and fourth sides define a height of the substrate, wherein the third and fourth sides extend along the first direction, wherein the core of the substrate extends between the first, second, third, and fourth sides and along the first direction, and wherein individual layers of the first and second sets of polymer layers alternate within the core of the substrate along the third direction.

20. A simulated natural wood-grained polymer substrate having a length defined along a first direction, a width defined along a second direction perpendicular to the first direction, and a height defined along a third direction perpendicular to both the first and second directions, the substrate comprising:
  a first set of polymer layers extending along the first direction and containing a first colorant, a majority of the first set of polymer layers being substantially continuous along the first direction; and
  a second set of polymer layers extending along the first direction and containing a second colorant different than the first colorant, a majority of the second set of polymer layers being substantially continuous along the first direction;
  wherein individual layers of the first and second sets of polymer layers alternate within the substrate along the third direction to form a natural wood-grained appearance throughout the substrate; and
  wherein a plurality of the individual layers of one of the plurality of the first and second sets of polymer layers extend along a substantially uninterrupted curvilinear path in the second direction originating proximate an outer surface of a first portion of the substrate and terminating proximate an outer surface of a second portion of the substrate.

21. The substrate of claim 20, wherein the layers of the first set of polymer layers are thinner than layers of the second set of polymer layers.

22. The substrate of claim 20, wherein the first and second sets of polymer layers are formed from high density polyethylene.

23. The substrate of claim 22, wherein the core is substantially free of natural wood materials.

24. A simulated natural wood-grained polymer board comprising:
  a polymer core having a first side and a second side spaced apart from the first side, spacing between the first and second sides defining one of a width or a height of the core, the first and second sides extending along a length direction of the core between a first end and a second end, the first and second ends defining a length of the core;
  a first set of polymer layers extending along the length direction and containing a first colorant, a majority of the first set of polymer layers extending along the entire length of the core;
  a second set of polymer layers extending along the length direction and containing a second colorant different than the first colorant, a majority of the second set of polymer layers extending along the entire length of the core; and
  wherein a plurality of individual layers of the first and second sets of polymer layers alternate within the core and extend along a substantially uninterrupted curvilinear path originating from proximate the first side of the core and terminating proximate the second side of the core.

* * * * *